(12) United States Patent
Chen et al.

(10) Patent No.: US 7,627,778 B2
(45) Date of Patent: Dec. 1, 2009

(54) PREDICTION-BASED DATA REASSIGNMENT

(75) Inventors: HuaYuan Chen, Singapore (SG);
MingZhong Ding, Singapore (SG);
Patrick TaiHeng Wong, Singapore (SG); CheeSeng Toh, Singapore (SG);
KianKeong Ooi, Singapore (SG);
JackMing Teng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 405 days.

(21) Appl. No.: 11/614,780

(22) Filed: Dec. 21, 2006

(65) Prior Publication Data

US 2008/0155304 A1 Jun. 26, 2008

(51) Int. Cl.
*G06F 11/00* (2006.01)
(52) U.S. Cl. ......................................................... 714/8
(58) Field of Classification Search ...................... 714/2, 714/5–8, 13, 15, 16, 20, 21, 42, 43, 54
See application file for complete search history.

(56) References Cited

U.S. PATENT DOCUMENTS

| | | | |
|---|---|---|---|
| 5,918,001 A | 6/1999 | Ueno et al. | |
| 6,034,831 A | 3/2000 | Dobbek et al. | |
| 6,078,452 A | 6/2000 | Kittilson et al. | |
| 6,098,185 A | 8/2000 | Wilson | |
| 6,223,303 B1 | 4/2001 | Billings et al. | |
| 6,282,670 B1 | 8/2001 | Islam et al. | |
| 6,490,691 B1 | 12/2002 | Kimura et al. | |
| 6,557,141 B1 * | 4/2003 | Gill et al. | 714/771 |
| 6,574,699 B1 | 6/2003 | Dobbek | |
| 6,654,193 B1 | 11/2003 | Thelin | |
| 6,711,628 B1 | 3/2004 | Thelin | |
| 6,898,036 B2 * | 5/2005 | Gill et al. | 360/53 |
| 7,047,438 B2 | 5/2006 | Smith et al. | |
| 7,490,263 B2 * | 2/2009 | King | 714/8 |
| 2003/0028841 A1 * | 2/2003 | Rushton et al. | 714/781 |
| 2006/0171057 A1 | 8/2006 | Lee | |

* cited by examiner

*Primary Examiner*—Nadeem Iqbal
(74) *Attorney, Agent, or Firm*—Leanne Taveggia Farrell; Westman, Champlin & Kelly, P.A.

(57) ABSTRACT

A method of handling a write error is provided. A write error is detected during a write operation on at least one data storage segment. A reassignment mode is selected from a plurality of different reassignment modes.

18 Claims, 6 Drawing Sheets

PREDICTION-BASED DATA REASSIGNMENT

FIELD OF THE DISCLOSURE

The present disclosure relates generally to data storage systems, and more particularly but not by limitation to reassigning data segments on a storage medium.

BACKGROUND OF THE INVENTION

Data storage systems are used in a variety of different applications. Many different types of data storage systems exist, such as solid-state and non-solid state systems. A disc drive is an example of a type of non-solid state storage system. A disc drive includes at least one rotating disc or storage medium for storage of digital information in a plurality of circular, concentric data tracks. The storage medium passes under a respective bearing slider surface. Each slider carries one or more transducers, which writes information to and reads information from the data surfaces of the disc(s). The slider and transducers are often together referred to as a "head."

A disc drive also includes an actuator assembly that moves the head or heads from an inner diameter to an outer diameter of a storage medium and across data tracks under control of electronic circuitry. The actuator assembly includes a track accessing arm, a suspension for each head and a voice coil motor. In general, each head is supported by a suspension that is in turn attached to the track accessing arm. The voice coil motor rotates the track accessing arm about a pivot shaft to position a head over a desired data track.

Recently, data storage systems, such as disc drives, are being used to a greater extent in hand-held consumer electronics, such as digital music players, cell phones and personal data assistants. Disc drives that are used in hand-held devices have performance reliability concerns. In particular, the durability of data storage systems in hand-held devices is a major concern. For example, a disc drive in a hand-held device can undergo frequent shock events, such as accidental drops. In addition, some hand-held devices themselves are active shock generators. For example, a hand-held phone set on a vibration mode causes momentary shock events during vibration. Even a ring tone on a hand-held phone can provide a source of momentary shock if the volume is set high enough.

Although some preventative measures exist to address momentary shock, such as operational shock sensors, additional measures are desired to address specific issues. However, some of these additional measures can have undesirable effects. For example, often times burst errors cause a disc drive to repeatably reassign data segments to spare data segments. In addition, burst errors cause a data storage system to reassign many consecutive data segments to spare segments. Repeatable reassignment and consecutive reassignment of data segments during various error bursts can vastly limit an amount of capacity that a data storage system can utilize.

SUMMARY

A data storage system is provided, which includes a storage medium logically divided into data segments and processing circuitry that is able to carry out the reallocation or movement of data. Processing circuitry is configured to perform a method of handling a write error. A write error is detected during a write operation on at least one data storage segment. A reassignment mode is selected from a plurality of different reassignment modes. The processing circuitry is also configured to gather empirical evidence indicative of the write error such that the selection of the reassignment mode from the plurality of reassignment modes is based on the empirical evidence.

Other features and benefits that characterize one or more embodiments of the disclosure will be apparent upon reading the following detailed description and review of the associated drawings.

DETAILED DESCRIPTION OF ILLUSTRATIVE EMBODIMENTS

Figure 1:
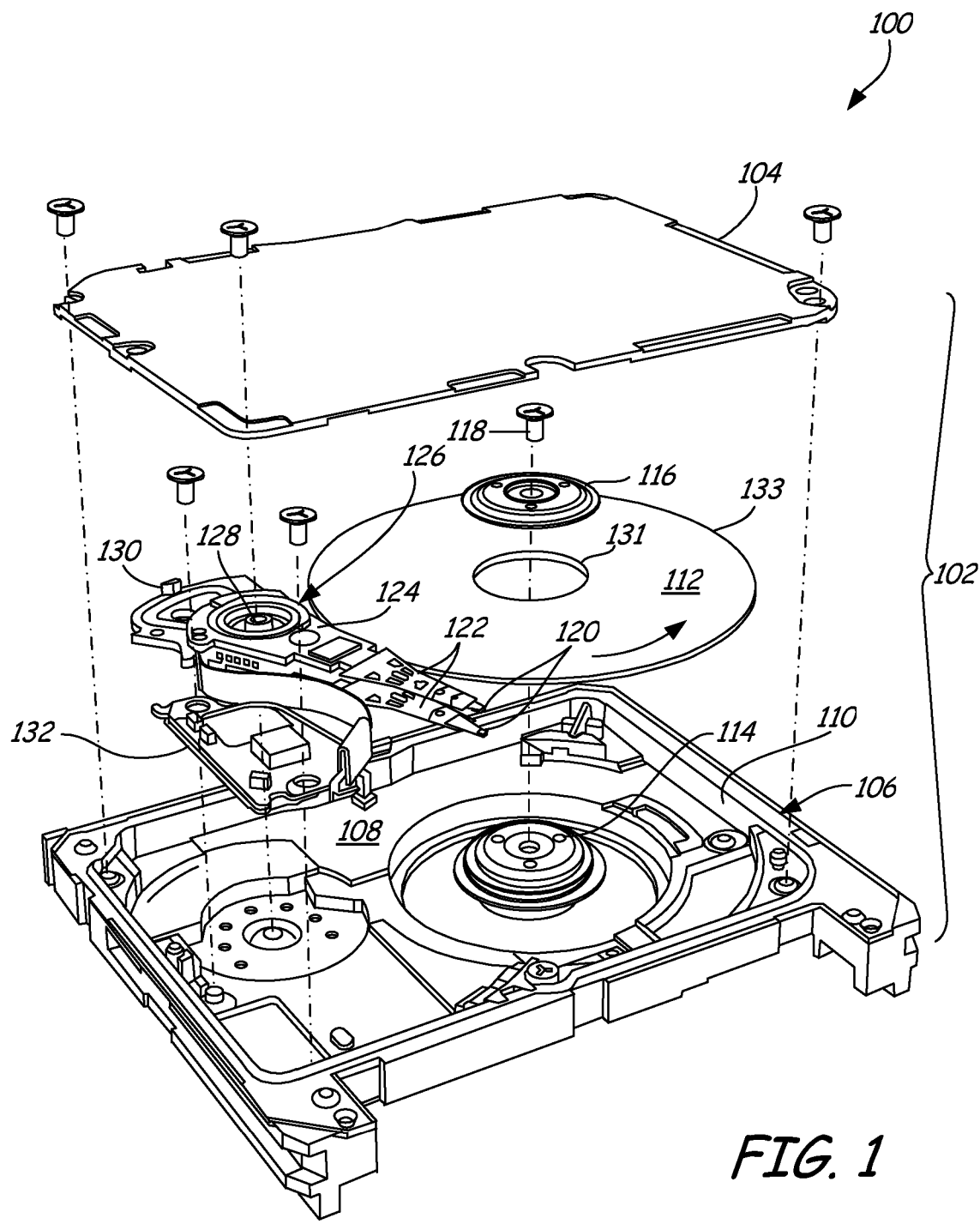
FIG. 1 is an exploded perspective view of a disc drive.

FIG. 1 is an exploded perspective view of a data storage system 100 in which one or more embodiments of the present disclosure are useful. In one embodiment data storage system 100 includes a disc drive. One or more embodiments of the present disclosure are also useful in other types of data storage.

Data storage system 100 includes a housing 102 having a cover 104 and a base 106. As shown, cover 104 attaches to base 106 to form an enclosure 108 enclosed by a perimeter wall 110 of base 106. The components of data storage system 100 are assembled to base 106 and are enclosed in enclosure 108 of housing 102. As shown, disc drive 100 includes a disc or storage medium 112. Although FIG. 1 illustrates storage medium 112 as a single disc, those skilled in the art should understand that more than one disc can be used in data storage system 100. Storage medium 112 stores information in a plurality of circular, concentric data tracks which are further subdivided into data sectors. Storage medium 112 is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries transducers that communicate with the surface of the medium. The slider and transducers are often together referred to as a read/write head.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130, which is controlled by servo control circuitry within internal circuit 132. Voice coil motor 130 rotates actuator mechanism 126 to position sliders 120 relative to desired data tracks, between a disc inner diameter 131 and a disc outer diameter 133.

Figure 2:
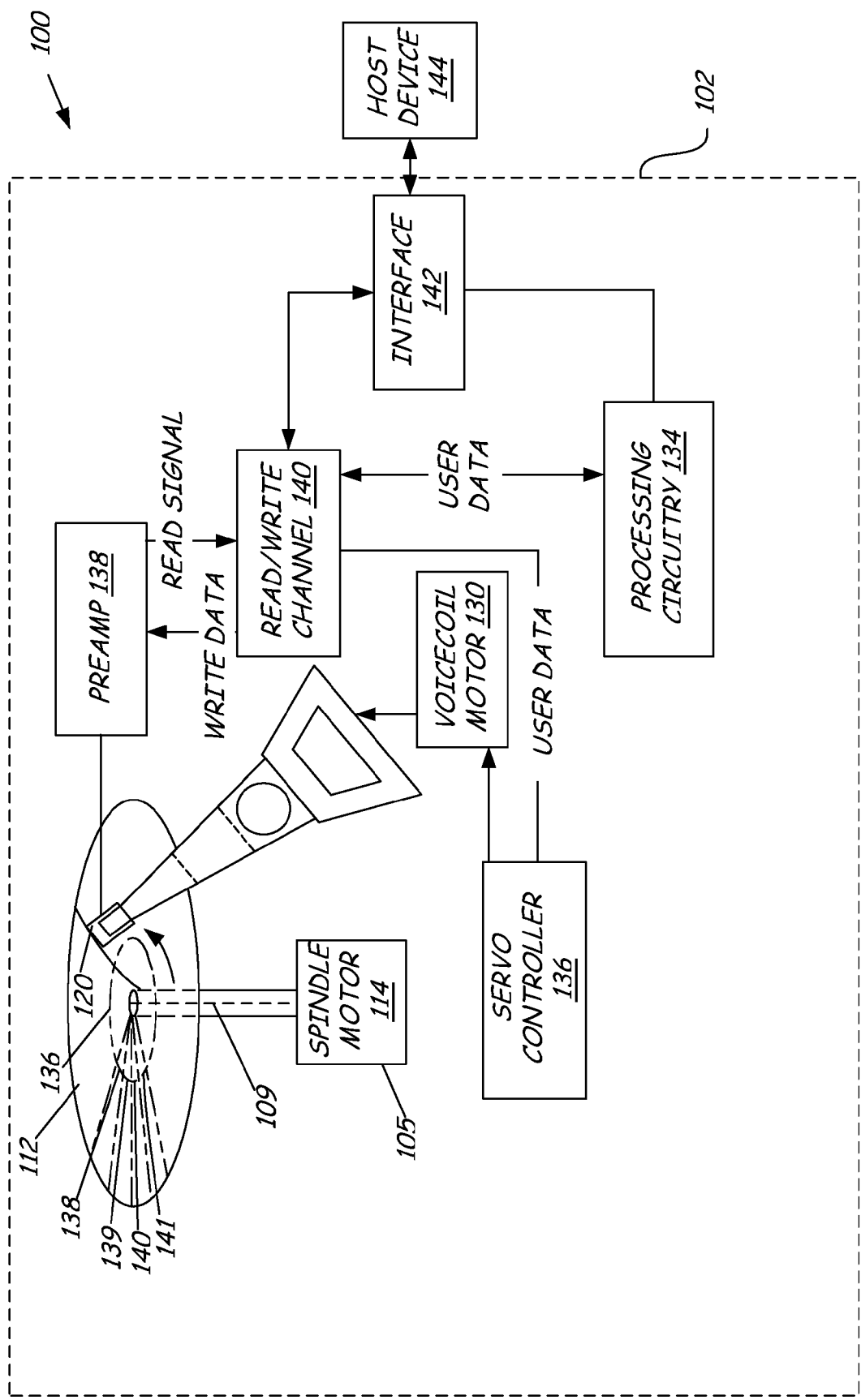
FIG. 2 illustrates a schematic diagram of the disc drive illustrated in FIG. 1.

FIG. 2 is a simplified block diagram of data storage system 100 illustrated in FIG. 1 having housing 102. Data storage system 100 includes processing circuitry 134, which is used for controlling certain operations of data storage system 100 in a known manner. In accordance with some embodiments, processing circuitry 134 is also used for carrying out the reallocation or reassignment of data.

As mentioned above, storage medium 112 is logically divided into a plurality of data segments. An example data track 136 and example data segments 138-141 are illustrated in FIG. 2. In general, data segments 138-141 are considered to be data sectors for storage of user data. However, data segments 138-141 can also be considered data wedges. Data wedges can span across more than one data sector as well as include partial data sectors. Sometimes, data segments in a data track can become defective or "bad" during normal operation of data storage system 100. To accommodate defective segments, storage medium 112 includes a reserve of spare segments for replacing the defective segments. If a defective segment is discovered, data in the defective segment is reassigned to a spare segment. The determination of the defectiveness of a segment is often times determined during a write or read operation.

Data storage system 100 further includes a preamplifier (preamp) 138 for generating a write signal applied to sliders 120 during a write operation, and for amplifying a read signal emanating from slider 120 during a read operation. A read/write channel 140 receives data from processing circuitry 134 during a write operation, and provides encoded write data to preamplifier 138. During a read operation, read/write channel 140 processes a read signal generated by preamp 138 in order to detect and decode data recorded on medium 112. The decoded data is provided to processing circuitry 134 and ultimately through interface 142 to a host device 144.

Data storage system 100 also includes servo controller 136 which generates control signals applied to VCM 130 and spindle motor 114. Processing circuitry 134 instructs servo controller 136 to seek read/write head 120 to desired tracks. Servo controller 136 is also responsive to servo data, such as servo burst information recorded on medium 112 in embedded servo fields or servo wedges included in the data tracks. Both track seeking and track following operations typically require generation of a position error signal (PES) which gives an indication of the radial position of the read/write head with respect to the tracks on the disc. In high performance disc drives, the PES is derived from either a prerecorded servo disc with a corresponding servo head (a dedicated servo system), or from servo information that is embedded on each recording surface among user data blocks at predetermined intervals (an embedded servo system). The read/write head provides the servo information to the servo control circuitry which generates the PES with a magnitude that is typically equal to zero when the head is positioned over the center of the track ("on track"), and is linearly proportional to a relative off-track distance between the head and the center of the track.

Example data storage system 100 illustrated in FIGS. 1 and 2 is a type of data storage system that can be used in hand-held consumer electronic products, such as digital music players, cell phones, personal data assistants and etc. In such an environment, data storage system 100 can frequently be exposed to momentary shock events due to the portability of hand-held devices in which it is located. Burst errors are types of error that data storage system 100 can experience. In particular, momentary shock is one of the most common sources of burst errors for a disc drive in a hand-held device. Sometimes burst errors can occur during a write operation. In such an instance, data storage system 100 may believe that the burst error caused damage to the storage medium during the write operation and will reassign data in the affected data segments to a spare segment.

Figure 3:
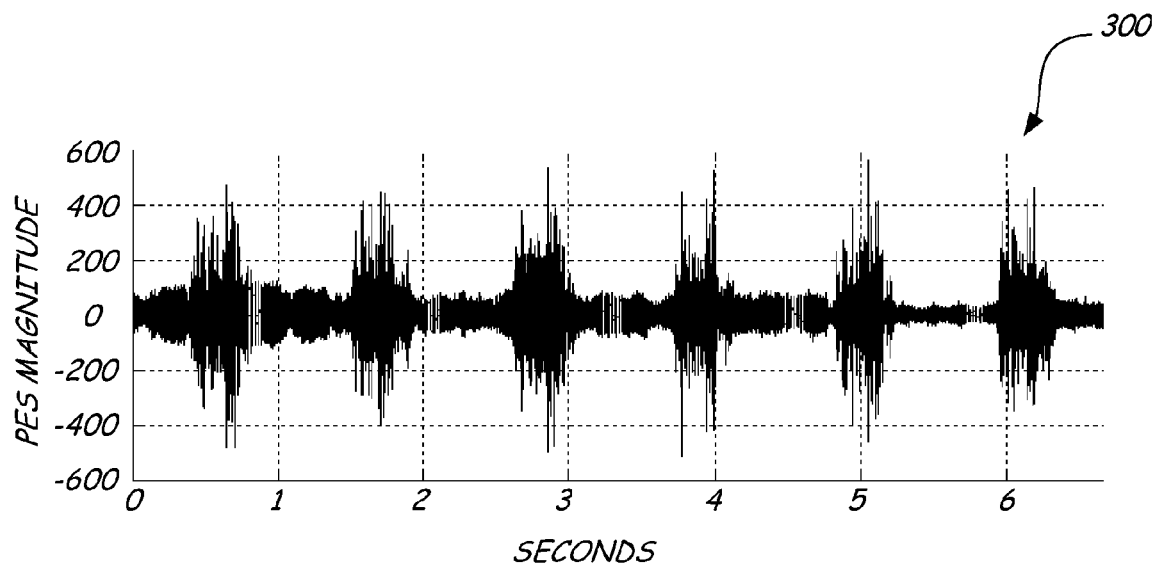
FIG. 3 is a graphical representation of a position error signal (PES) profile.

Different types of empirical evidence can be gathered from a write failure or write error. One such type of empirical evidence is PES information. FIG. 3 is a graphical representation 300 of a PES (position error signal) profile during the duration of a momentary shock event in a hand-held device. Based on the PES profile illustrated in FIG. 3, it can easily be observed that momentary shock causes much deviation from a nominal PES (i.e., a magnitude substantially equal to zero). In general, when PES deviation exceeds a threshold value, an operational shock sensor is triggered and causes at least a portion of the write operation to be blocked. The graphical representation 300 of the captured PES profile demonstrates two behaviors. First, a write operation may continue to attempt to write throughout a shock event that causes intermittent deviations of the PES. For example, in FIG. 3, the shock event causes significant deviation of the PES once a second. Intermittent deviations over such a period of time can cause a data storage system to attempt to write many data segments with frequent interruption due to the intermittent deviations. During the write operation, the data storage system may reassign many of the data segments attempted to be written and therefore consecutively reassign data segments that may not need to be reassigned because the underlying media of the data segments are not defective. Second, a write operation may attempt to repeatedly rewrite the same data on many different data segments because it is repeatedly interrupted by the intermittent deviations of PES. This type of behavior is known as repeated reassignment.

Figure 4:
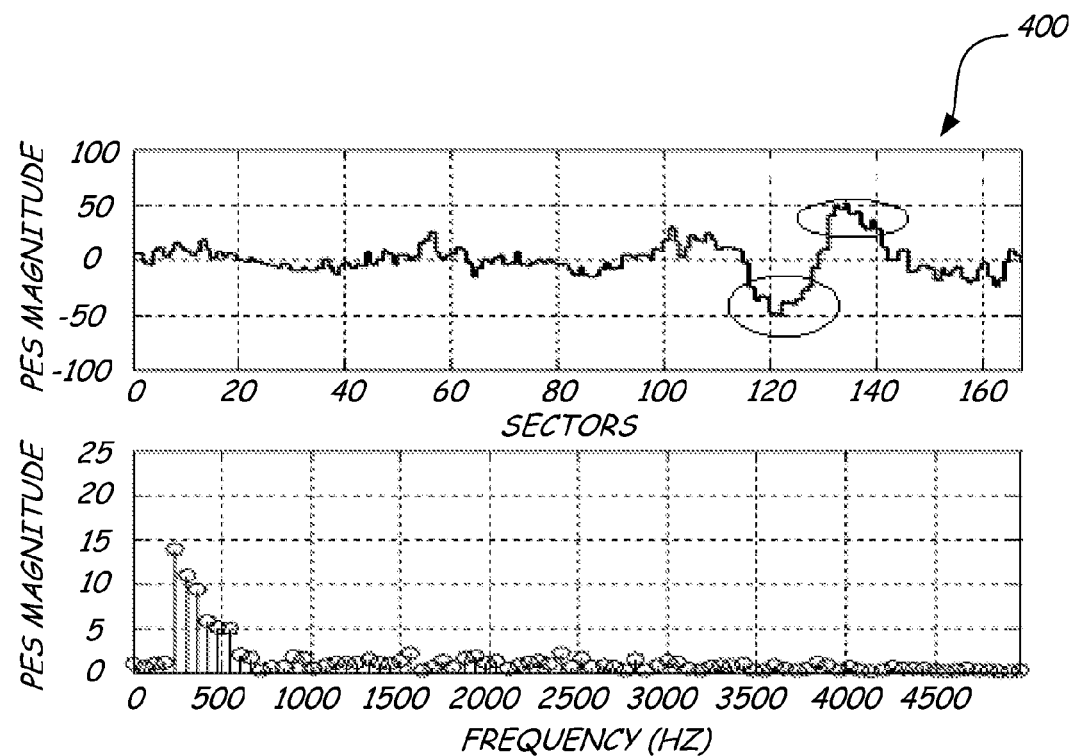
FIG. 4 is a graphical representation of an repeatable runout (RRO) drift.

Another type of empirical evidence that can be gathered from a write failure or write error includes repeatable runout (RRO) drift. Repetitive learning compensators (also called "repetitive learning controllers" or "RLCs") are implemented in code to reject repetitive disturbances, such as RRO. Examples of sources of RRO include disturbances associated with the spindle motor, and written-in RRO which is a special repetitive disturbance having a fundamental frequency equal to the spindle frequency. Often RRO drift is caused by temperature fluctuations. FIG. 4 illustrates a pair of graphical representations 400. FIG. 4 illustrates segments of which are circled that are affected by a typical RRO drift caused by temperature. A write operation to the circled data segments of the top most graphical representation will most likely be unsuccessful due to an operational shock sensor trigger as previously discussed. If replacement data segments happen to be within the affected segments (i.e., segments that are circled), the replacement data segments will also experience write failure and will result in repeated reassignment.

Repeated reassignment and reassignment of consecutive data segments can have many detrimental consequences. For example, a data storage system can run out of precious spare data segment space. A repeated reassignment consumes at least one new spare data segment for each repeat. A disc drive that runs out of spare data segments is unable to handle new grown defects and functions abnormally. In another example, the host operations can time out. Each data segment in error can undergo a series of time-consuming defect tests before it is finally considered defective and is reassigned. Consecutive or repeated reassignment can significantly prolong write operations. In yet another example, a reassignment list or table can grow rapidly and become full with repeated and consecutive reassignments. Consecutive reassignments generate many reassignment entries and although repeated reassignment generates only a single reassignment entry, each reassignment entry due to repeated reassignment occupies more space than a single entry because all previously used replacement segments must be recorded with the reassignment list such that previously used replacement segments will not be used as replacement segments again upon new reassigning. A full reassignment list renders a disc drive unable to handle new grown defects.

Figure 5:
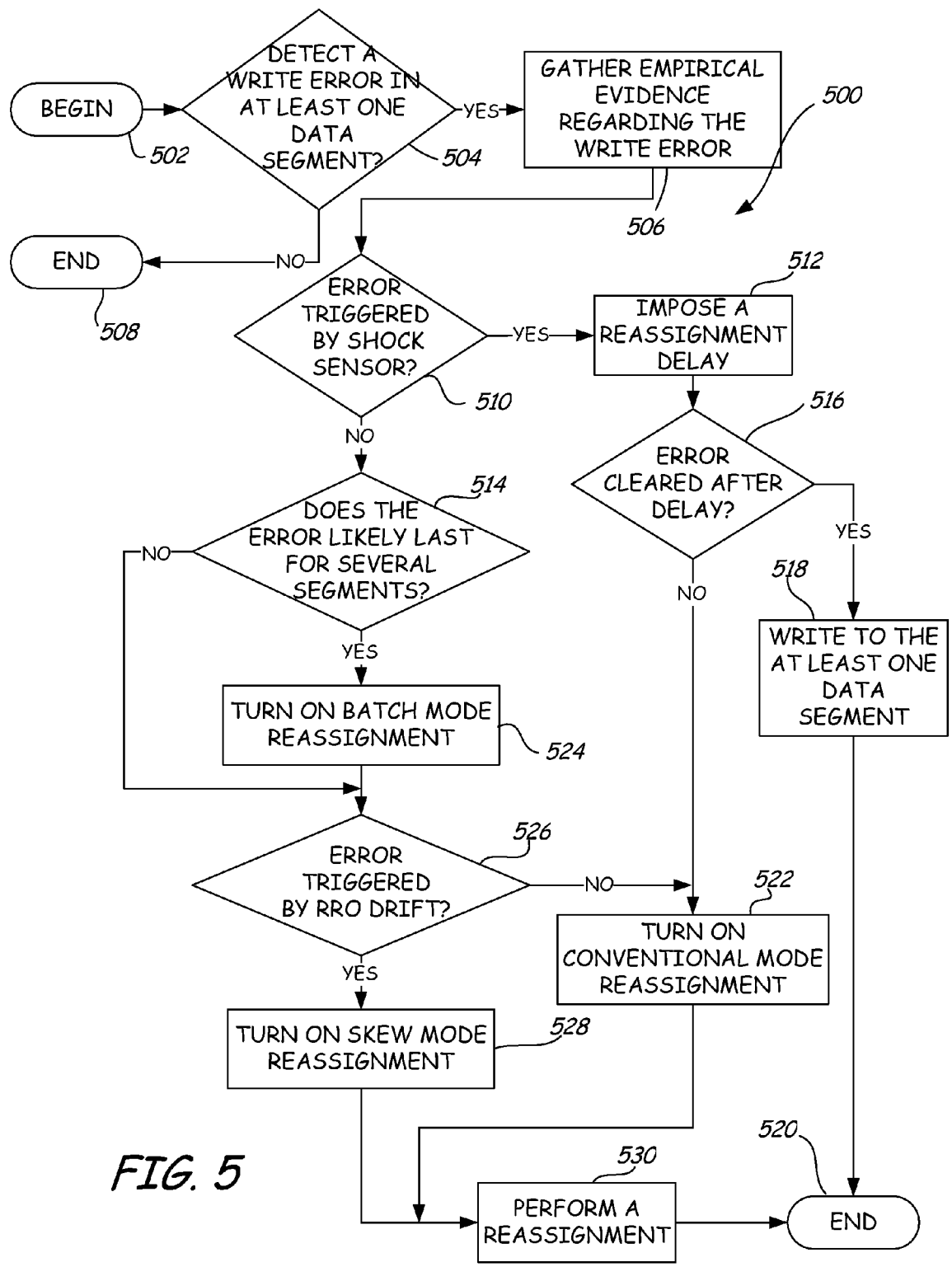
FIG. 5 illustrates a process flow chart of a method of handling write errors.

In some embodiments, processing circuitry, such as processing circuitry 134 (FIG. 2), handles write errors during write operations and prevents repeated reassignment of data segments and consecutive reassignment of data segments. FIG. 5 illustrates a process flow chart 500 of a method of handling write failures, which processing circuitry 134 is configured to control. The process begins at START 502 and continues to a decision block 504. At decision block 504, processing circuitry 134 determines whether there has been a write failure or write error to at least one of the data segments being written in the current write operation. If there has not been a write failure, the process ends at END 508. If a write error has occurred, the process proceeds to action block 506. At action block 506, processing circuitry 134 gathers empirical evidence regarding the write error. Examples of empirical evidence include information related to an operational shock sensor, the likely length of the write error, PES and RRO drift. The process then proceeds to decision block 510.

At block 510, processing circuitry 134 determines whether the write error was detected by an operational shock sensor in decision block 504. If the write error was detected by the operational shock sensor, the process proceeds to action block 512. If the write error was not detected by an operational shock sensor, then the process proceeds to decision block 514. In general, a write error detected by an operational shock sensor is likely a write error resulting from a momentary shock and the physical medium likely is still in good condition. Therefore, at action block 514, a reassignment time delay is imposed prior to reassignment. The imposed reassignment time delay allows at least one data segment a temporary error clearance time interval such that the at least one data segment can be subsequently and safely written after expiration of the time interval. An imposed reassignment delay avoids unnecessary reassignments and minimizes repeated reassignments.

During the delay, processing circuitry 134 actively monitors the error status. The process proceeds to decision block 516 and processing circuitry 134 determines whether the write error has cleared after the imposed reassignment delay. If the write error has cleared, then the process proceeds to action block 518. At action block 518, no reassignment is made and data is allowed to be written to the original data segment. The process then ends at END 520. If the write error still exists after the imposed reassignment delay expires, then the process proceeds to action block 522 in which a conventional mode reassignment is turned on. A conventional mode reassignment reassigns data segments on a segment by segment basis and generally to a spare segment at the end of the affected data track.

At decision block 514, processing circuitry 134 determines whether the write error likely lasts for several data segments. If the write error is deemed to carry on for several data segments, then the process proceeds to action block 524. If the write error does not likely last for several data segments, then the process proceeds to decision block 526. At action block 524, a batch mode reassignment is turned on. A batch mode reassignment will provide a method of reassigning a series of consecutive data segments simultaneously instead of reassigning on an individual basis. A write error that likely lasts for a series of consecutive data segments likely means that those data segments will all experience similar types of write failures. The data segments chosen for reassignment are also consecutive spare data segments. By reassigning consecutive data segments to consecutive spare data segments, only a single reassignment entry is recorded, which indicates the start of the reassignment and data segment length. Batch mode reassignment provides a method that greatly reduces the amount of reassignment entries and increases the amount of time involved in the reassigning process.

Figure 6:
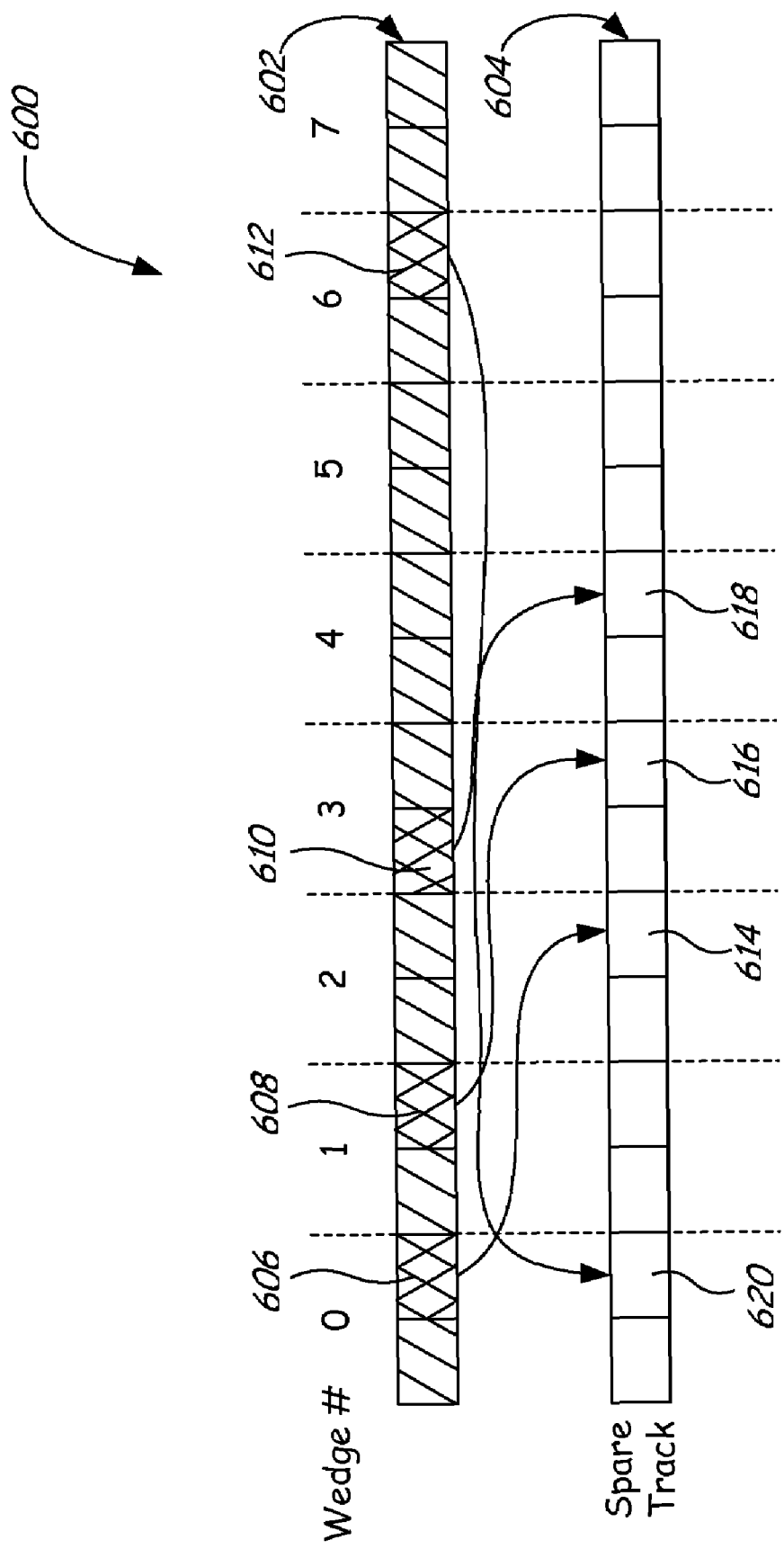
FIG. 6 illustrates an example of skew mode reassignment.

At decision block 526, processing circuitry determines whether the write error is triggered by a RRO drift. If the write error is triggered by a RRO drift, then the process proceeds to action block 528. If, however, the write error is not triggered by a RRO drift, then the process proceeds to action block 522 where conventional mode reassignment is turned on as discussed above. At action block 528, a skew mode reassignment is turned on. FIG. 6 is a simplified diagram 600 demonstrating an exemplary skew mode reassignment from a first data track 602 to a second data track 604. The example in FIG. 6 refers to data sectors as data segments. Second data track 604 is a spare data track. In FIG. 6, a reassigned data sector is placed in a spare data sector that is located at a skew angle from its original position as a bad data sector. In other words, a reassigned data sector is positioned in a spare data sector at a particular distance away from the original data sector it was positioned in. Information in data sectors 606, 608, 610 and 612 have been reassigned to spare sectors 614, 616, 618 and 620, respectively. As illustrated in FIG. 6, each reassigned data sector is four data sectors away from each original data sector. The skew reassignment mode is used to minimize repeat reassignment caused by RRO drift errors. After skew mode reassignment has been turned on, then the process proceeds to action block 522.

If a reassignment mode is turned on in block 524, block 528 or block 522, then processing circuitry 134 (FIG. 2) performs reassignment of the at least one data segment at action block 530. The type of reassignment that is performed is based on the reassignment modes selected in earlier steps in the process. For example, if reassignment is due to an error not being cleared after an imposed delay, if the write error fails to likely last for several data storage segments or if the write error failed to be triggered by a repeatable run-out (RRO) drift, then conventional reassignment is performed at block 530. If reassignment is for data segments in which batch mode reassignment has been turned on, then batch mode reassignment is performed at block 530. If reassignment is for a data segment which skew mode reassignment has been turned on, then skew mode reassignment is performed at block 530.

Conventional reassignment schemes cannot effectively handle consecutive and skewed data segment reassignment properly. Each data track in conventional storage mediums includes at least one spare data segment. If a select data segment in a select data track needs to be reassigned, the spare segment(s) at the end of the data track are first examined for reassignment. If the spare sector(s) at the end of the select data track are not being used, a zigzag search is performed to examine spare sector(s) on adjacent data tracks until free spare data segment(s) are found.

Figure 7:
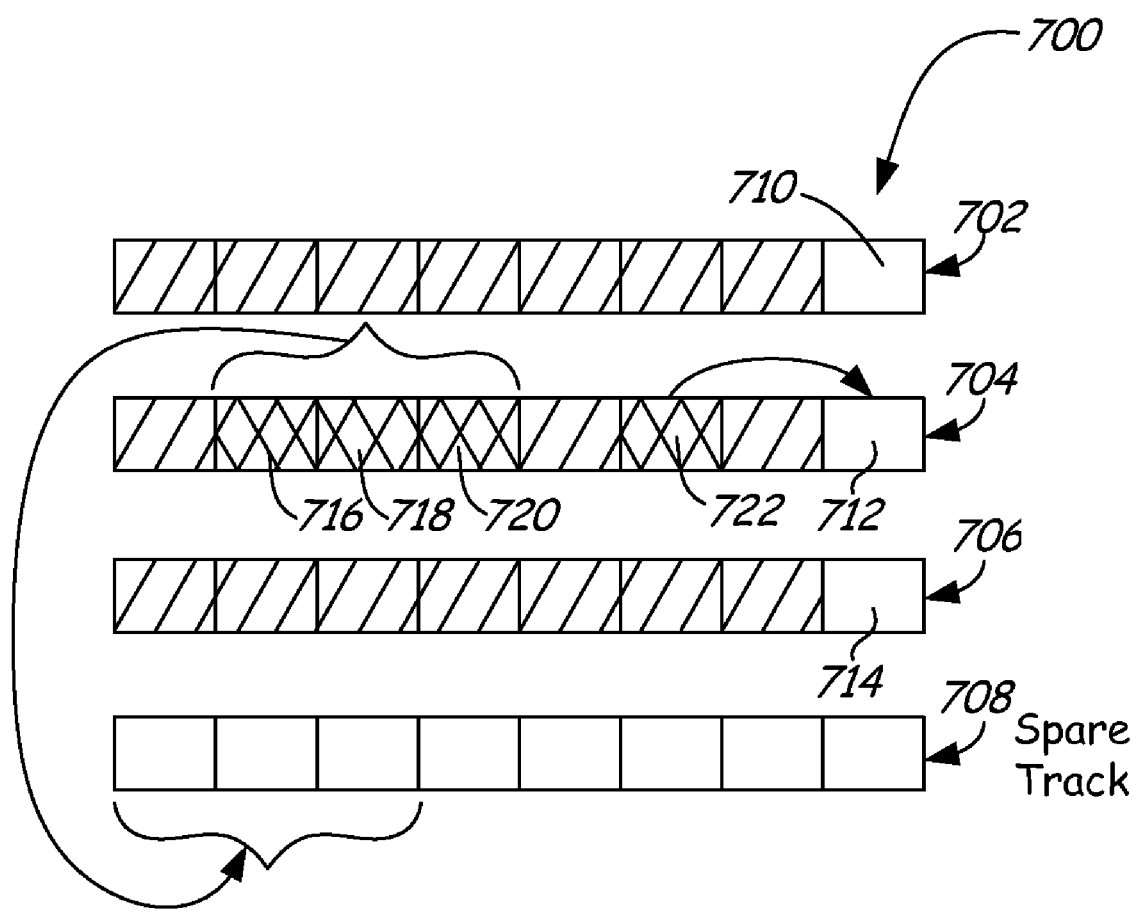
FIG. 7 illustrates an example of a reassignment scheme that can accommodate batch mode reassignment and skew mode reassignment.

FIG. 7 illustrates a simplified diagram 700 of a reassignment scheme that can handle consecutive and skewed data segment reassignment. FIG. 7 refers to data sectors as data segments. Diagram 700 includes a first data track 702, a second data track 704, a third data track 706 and a spare data track 708. In addition to spare data sectors 710, 712 and 714 located at the end of data tracks 702, 704 and 706, diagram 700 also includes spare data sectors in data track 708. Except for the spare data sectors located at the end of each data track, there will be specially spared data tracks for reassignment, such as spare data track 708, in each data zone of the storage medium. The spare data tracks, such as spare data track 708, can be effectively used for consecutive and skewed data sector reassignment. For example, in FIG. 7, data sectors 716, 718 and 720 have been flagged for consecutive reassignment or batch mode reassignment. Therefore, data sectors 716, 718 and 720 are reassigned to spare data track 708. On the other hand, data sector 722 is reassigned to the spare data sector at the end of data track 704.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matter of structure and arrangement of parts within the principles of the present invention to the full extent indicated by the broad general meaning of the terms in which the appended claims are expressed. For example, the particular elements may vary depending on the particular application for data sector reassignment while maintaining substantially the same functionality without departing from the scope of the present invention. In addition, although the embodiments described herein are directed to a data storage system for non-volatile storage of data, it will be appreciated by those skilled in the art that the teaching so the disclosure can be applied to the correction of errors in volatile memory or dynamic memory, without departing from the scope of the invention.

What is claimed is:

1. A method of handling a write error comprising:
   detecting a write error during a write operation on at least one data storage segment;
   gathering empirical evidence related to at least one of position error signal (PES) information and repeatable runout (RRO) drift for the write error; and
   selecting a reassignment mode from a plurality of different reassignment modes based on the empirical evidence.

2. The method of claim 1, wherein selecting the reassignment mode from the plurality of reassignment modes comprises selecting a batch mode reassignment if the write error will likely last for several data storage segments.

3. The method of claim 1, wherein selecting the reassignment mode from the plurality of reassignment modes comprises selecting a skew mode reassignment if the write error was triggered by a repeatable run-out (RRO) drift.

4. The method of claim 1, wherein selecting the reassignment mode from the plurality of reassignment modes comprises selecting a conventional mode reassignment if the write error fails to likely last for several data storage segments and if the write error failed to be triggered by a repeatable run-out (RRO) drift.

5. The method of claim 1, further comprising imposing a reassignment delay if the write error was triggered by an operational shock sensor.

6. The method of claim 5, further comprising writing to the at least one data storage segment if the write error clears after the imposed delay.

7. The method of claim 5, further comprising selecting a conventional mode reassignment if the write error fails to clear after the imposed delay.

8. The method of claim 1, further comprising performing a reassignment of the at least one data sector based on the selected reassignment mode from the plurality of reassignment modes.

9. A data storage system comprising:
   a storage medium logically divided into data segments;
   processing circuitry configured to carry out the reallocation of data by:
   detecting a write error during a write operation on at least one of the data storage segments;
   gathering empirical evidence related to at least one of position error signal (PES) and repeatable runout (RRO) drift for the write error; and
   selecting a reassignment mode from a plurality of different reassignment modes based on the empirical evidence.

10. The data storage system of claim 9, wherein the processing circuitry is configured to select a reassignment mode from a plurality of different reassignment modes comprises selecting a batch mode reassignment if the write error will likely last for several data storage segments.

11. The data storage system of claim 9, wherein the processing circuitry is configured to select a reassignment mode from a plurality of different reassignment modes comprises selecting a skew mode reassignment if the write error was triggered by a repeatable run-out (RRO) drift.

12. The data storage system of claim 9, wherein the processing circuitry is configured to select a reassignment mode from a plurality of different reassignment modes comprises selecting a conventional mode reassignment if the write error fails to likely last for several data storage segments and if the write error failed to be triggered by a repeatable run-out (RRO) drift.

13. The data storage system of claim 9, wherein the processing circuitry is further configured to impose a reassignment delay if the write error was triggered by an operational shock sensor.

14. The data storage system of claim 13, further comprising a read/write head configured to write to the at least one data storage segment if the write error clears after the imposed delay.

15. The method of claim 13, wherein the processing circuitry is further configured to select a conventional mode reassignment if the write error fails to clear after the imposed delay.

16. A method of handling a write error comprising:
    detecting a write error during a write operation on at least one data storage segment;
    gathering empirical evidence indicative of the write error; and
    selecting a reassignment mode from a plurality of different reassignment modes based on the gathered empirical evidence.

17. The method of claim 16, further comprising imposing a reassignment delay if the write error was triggered by an operational shock sensor.

18. The method of claim 17, further comprising one of writing to the at least one data storage segment if the write error clears after the imposed delay and selecting a conventional mode reassignment if the write error fails to clear after the imposed delay.

* * * * *

UNITED STATES PATENT AND TRADEMARK OFFICE
CERTIFICATE OF CORRECTION

PATENT NO. : 7,627,778 B2 Page 1 of 1
APPLICATION NO. : 11/614780
DATED : December 1, 2009
INVENTOR(S) : Hua Yuan Chen et al.

It is certified that error appears in the above-identified patent and that said Letters Patent is hereby corrected as shown below:

Column 7,
Line 46, claim 4, delete "falls" and insert --fails--.

Signed and Sealed this

Thirtieth Day of March, 2010

David J. Kappos
*Director of the United States Patent and Trademark Office*